United States Patent
Kim

(10) Patent No.: US 7,711,397 B2
(45) Date of Patent: May 4, 2010

(54) PORTABLE COMMUNICATION TERMINAL FOR GAMES AND USER INTERFACING DEVICE THEREOF

(75) Inventor: Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 408 days.

(21) Appl. No.: 11/651,821

(22) Filed: Jan. 10, 2007

(65) Prior Publication Data
US 2007/0188412 A1 Aug. 16, 2007

Related U.S. Application Data

(60) Provisional application No. 60/757,930, filed on Aug. 3, 2006.

(30) Foreign Application Priority Data
Aug. 3, 2006 (KR) ...................... 10-2006-0073378

(51) Int. Cl.
G09G 3/28 (2006.01)
H04M 1/00 (2006.01)
H04B 7/00 (2006.01)
H05K 5/00 (2006.01)
H05K 7/00 (2006.01)
G06F 1/16 (2006.01)

(52) U.S. Cl. .............. 455/575.1; 455/575.3; 455/575.4; 455/66.1; 361/679.01; 361/679.27

(58) Field of Classification Search .............. 455/575.1, 455/575.8, 566; 361/679.01–679.61
See application file for complete search history.

(56) References Cited

U.S. PATENT DOCUMENTS

| | | | |
|---|---|---|---|
| 5,548,478 A * | 8/1996 | Kumar et al. .......... | 361/679.27 |
| 6,822,871 B2 | 11/2004 | Lee et al. | |
| 6,865,406 B2 | 3/2005 | Park | |
| 7,280,346 B2 * | 10/2007 | Lewis et al. ............. | 361/679.01 |
| D565,001 S * | 3/2008 | Loiske et al. ......... | D14/138 AA |
| 7,440,266 B2 * | 10/2008 | Yu ........................ | 361/679.27 |
| 7,443,657 B2 * | 10/2008 | Gitzinger et al. ....... | 361/679.27 |
| 2005/0063144 A1 | 3/2005 | Park et al. | |
| 2005/0107119 A1 | 5/2005 | Lee et al. | |
| 2005/0124394 A1 | 6/2005 | Kim et al. | |
| 2006/0105824 A1* | 5/2006 | Kim et al. ................. | 455/575.8 |
| 2008/0174942 A1* | 7/2008 | Yang et al. .................. | 361/680 |

* cited by examiner

Primary Examiner—Kent Chang
Assistant Examiner—Kashif Siddiqui
(74) Attorney, Agent, or Firm—The Farrell Law Firm, LLP

(57) ABSTRACT

Provided are a portable communication terminal that is easy to manipulate for games and a user interface device of the portable communication terminal. The portable communication terminal includes a main body, a rotation unit combined with the main body unit with respect to a hinge shaft at a predetermined position of the main body unit to be folded or unfolded and rotating towards or away from a top of the main body unit to open or close the top of the main body unit, and a slide unit combined with the main body unit to move while facing the main body unit and moving on a top of the rotation unit to open or close the rotation unit when the rotation unit is folded to the main body.

14 Claims, 5 Drawing Sheets

PORTABLE COMMUNICATION TERMINAL FOR GAMES AND USER INTERFACING DEVICE THEREOF

PRIORITY

This application claims priority under 35 U.S.C. §119 to a provisional patent application filed in the United States Patent and Trademark Office on Jan. 10, 2006 and assigned Ser. No. 60/757,930 and under 35 U.S.C. §119 to an application filed in the Korean Intellectual Property Office on Aug. 3, 2006 and assigned Ser. No. 2006-73378, the contents of which are incorporated herein by reference.

BACKGROUND OF THE INVENTION

1. Field of the Invention

The present invention generally relates to, and, in particular, to a portable communication terminal such as a Digital Multimedia Broadcasting (DMB) phone, a game phone, a chatting phone, a camera phone, a Moving Picture Experts Group (MPEG) Layer-3 (MP3) phone, a cellular phone, a Personal Communication Service (PCS) phone, a Personal Digital Assistant (PDA), and a Hand Held Phone (HHP), and in particular, to a portable communication terminal for games, which is easy to use in a game mode as well as in a phone mode, and a user interface device thereof.

2. Description of the Related Art

A portable communication terminal generally refers to an electronic apparatus which a user can carry with him/her to perform wireless communication with a desired partner. The wireless communication may be voice communication, message transmission, file transmission, video communication, and a camera function. Additionally, the portable communication terminal serves as a personal agent by performing phone number management and personal schedule management.

To enhance portability, designs of the portable communication terminal tend to be compact, slim, and light. Designs also include multimedia availability for a wide variety of service functions, e.g., entertainment functions including game services. In particular, future portable communication terminals are expected to incorporate greater multi-functionality and multi-purpose utilization including video communication, game, Internet, and camera functions as well as voice communication functions.

Conventional portable communication terminals may be classified into various types according to their appearance in consideration of portability and convenience in use, such as bar-type portable communication terminals and fold-type portable communication terminals. The bar-type portable communication terminal has a single housing shaped like a bar in which data input/output devices, an antenna device, and transmission/reception devices are mounted. The fold-type portable communication terminal has a folder coupled to a single bar-shaped housing by a hinge device in such a manner that the folder can fold towards and unfold away from the housing. A folder is rotatably coupled to a main body by a hinge unit, keys are disposed in the main body, and a display unit is disposed in the folder in the fold-type portable communication terminal, contributing to miniaturization and portability. A type of fold-type portable communication terminal is disclosed in U.S. Pat. No. 6,865,406, which discloses folder-type portable communication terminal, a camera lens housing is mounted in a hinge unit.

Additionally, the portable communication terminals may be further classified as swing-type communication terminals and slide-type communication terminals based upon the way of opening and closing the communication terminals. In the swing-type portable communication terminals, two housings are coupled to each other to allow one housing to rotatably open or close relative to the other while facing each other. In the slide-type portable communication terminal, two housings are coupled to each other to allow one housing to slide along a longitudinal direction to open or close the slide-type portable communication terminal.

For example, in the slide-type portable communication terminal, a main body and a slider are coupled to each other by a slide module while facing each other, a plurality of keys are disposed in the main body, and a display unit is disposed in the slider. Such a structure is advantageous to a wide display unit and provides easiness in opening/closing operations. A slide-type portable communication terminal is disclosed in detail in U.S. Pat. No. 6,822,871. In the slide-type portable communication terminal, a plurality of keys are disposed in a main body housing and a display unit is mounted in a slide housing. A swing-type portable communication terminal is disclosed in detail in U.S. patent application Ser. No. 10/822,380.

In the conventional fold-type portable communication terminal, a data input operation and a displayed data check operation are conveniently provided in a phone mode like voice communication or text message transmission. However, in multimedia environments, prompt and accurate data input operation, such as by key pressing, is degraded in a game mode and a wide screen cannot be provided in a display unit. The promptness and accuracy of key manipulation are more important in the game mode than in any other modes. In particular, key manipulation using both hands instead of one hand is crucial for improving promptness and accuracy.

Of course, the foregoing problems can be solved by increasing the size of the portable communication terminal, mounting a wide display unit in the portable communication terminal, and disposing a more number of keys in the portable communication terminal, which goes against miniaturization and causes inconvenience in carrying.

The slide-type portable communication terminal can be easily opened and closed, and provides a wide display unit. In both the slide-type portable communication terminal and the fold-type portable communication terminal, although an input problem does not arise in the phone mode, the user feels inconvenient in key manipulation in the game mode.

Therefore, there is a need for a portable communication terminal that is used as a convenient slide type in the phone mode and facilitates key manipulation with both hands in the game mode.

A portable communication terminal that is easy to use in the game mode is disclosed in U.S. patent application Ser. No. 10/946,838. However, the disclosed portable communication terminal is easy to use both in the phone mode and the game mode, but has a complex mechanical internal structure, resulting in a complex assembly process.

SUMMARY OF THE INVENTION

It is, therefore, an object of the present invention to provide a portable communication terminal that is used as a convenient slide type in a phone mode and facilitates a data input operation with both hands in a game mode, and a user interface device of the portable communication terminal.

It is another object of the present invention to provide a portable communication terminal, in which a slide-type and a fold-type are combined to provide convenience in key manipulation in a game mode as well as in a phone mode, and a user interface device of the portable communication terminal.

It is further another object of the present invention to provide a portable communication terminal, in which at least three keypads are disposed at proper locations thereof to facilitate a data input operation in various modes, and a user interface device of the portable communication terminal.

It is further another object of the present invention to provide a portable communication terminal, in which keys related to a phone mode are exposed to a user and the other keys are hidden in the phone mode in order to facilitate a data input operation and keys related to a game mode are exposed to the user and the other keys are hidden in the game mode in order to facilitate a data input operation, and a user interface device of the portable communication terminal.

It is further another object of the present invention to provide a portable communication terminal, in which a slide-type and a fold-type are combined to allow a user to easily input data and easily view displayed data in a phone mode and to allow a user to easily input data with both hands and easily view displayed data in a landscape view mode, and a user interface device of the portable communication terminal.

It is further another object of the present invention to provide a portable communication terminal, in which four keypads are disposed at proper locations thereof and a wide display device is mounted without causing a size increase, contributing to miniaturization and portability, and a user interface device of the portable communication terminal.

To achieve the above and other objects, there is provided a portable communication terminal including a main body, a rotation unit, and a slide unit. The rotation unit is combined with the main body unit about a hinge shaft at a predetermined position of the main body unit to be folded or unfolded and rotates towards or away from a top of the main body unit to close or open respectively the top of the main body unit. The slide unit is combined with the main body unit so that the slide unit can slide, while facing the main body unit, on a top of the rotation unit to open or close the rotation unit when the rotation unit is folded to the main body.

According to another aspect of the present invention, there is provided a user interface device of a portable communication terminal, which includes a first data input unit, a second data input unit, and a display unit. The second data input unit is combined with the first data input unit by a hinge shaft at a predetermined position of the first data input unit so that the second data input unit can rotate towards or away from, i.e. be folded to or unfolded from, a top of the first data input unit to close or open respectively the top of the first data input unit. The display unit is combined with the first data input unit so that the display unit, while facing the first data input unit, can slide to open or close a top of the second data input unit when the second data input unit is folded to the main body unit.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for conciseness.

Figure 1:
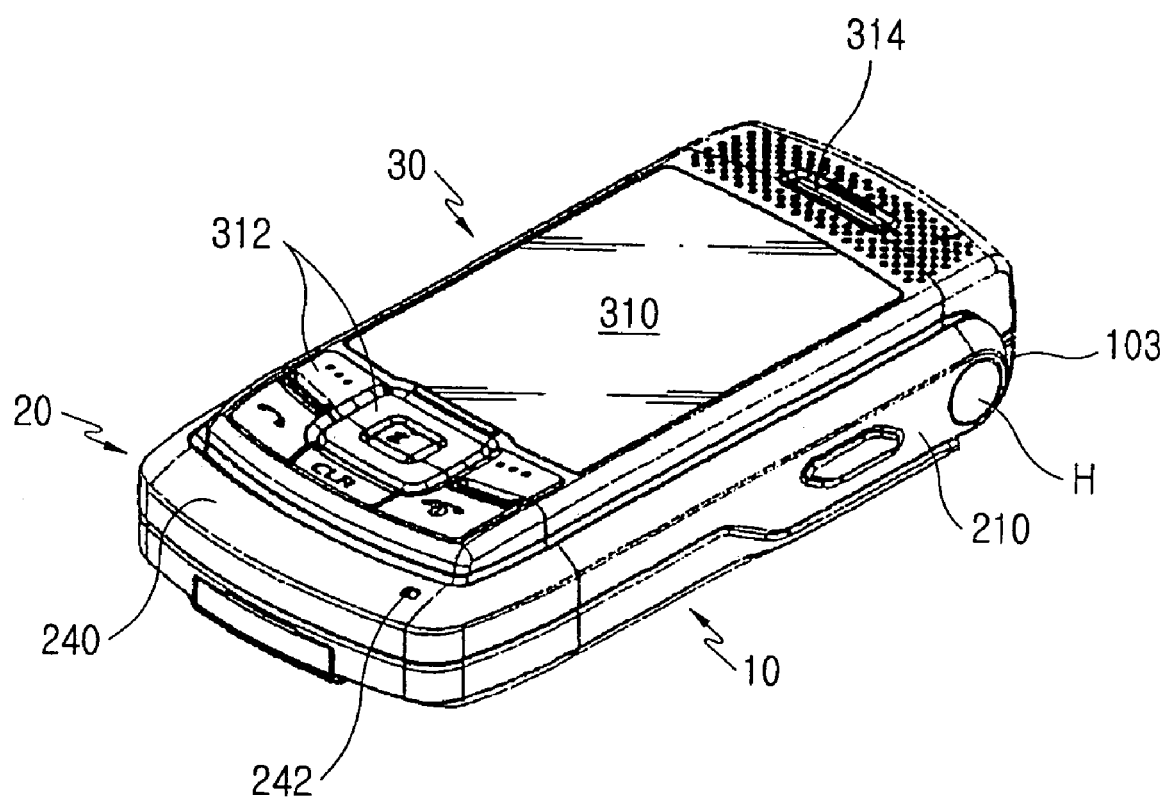
FIG. 1 is a perspective view of a portable communication terminal in a completely closed state according to the present invention.

As shown in FIGS. 1 through 4, a portable communication terminal according to the present invention is used as a slide-type in a phone mode and as a slide-then-fold-type in a game mode, thereby allowing a user to easily perform a data input operation and check displayed data. In particular, a portable communication terminal facilitating a user's data input operation in the game mode as well as in the phone mode and a user interface device of the portable communication terminal are proposed. More specifically, the portable communication terminal includes a main body unit 10, a rotation unit 20, and a slide unit 30 (FIG. 1). The rotation unit 20 is combined with the main body unit 10 and is folded to or unfolded from the main body unit 10 about a hinge shaft A (see FIG. 3) that is provided by a hinge unit H (FIG. 2) at a predetermined position of the main body unit 10. The rotation unit 20 rotates towards or away from a top 101 (see FIG. 3) of the main body unit 10 (see FIG. 3) to close or open respectively the top 101 of the main body unit 10. The rotation unit 20 is folded to the main body unit 10 in FIGS. 1 and 2. The rotation unit 20 rotates approximately 90° from the main body unit 10 in FIG. 3. The rotation unit 20 rotates approximately 180° to be unfolded from the main body unit 10 in FIG. 4.

Figure 2:
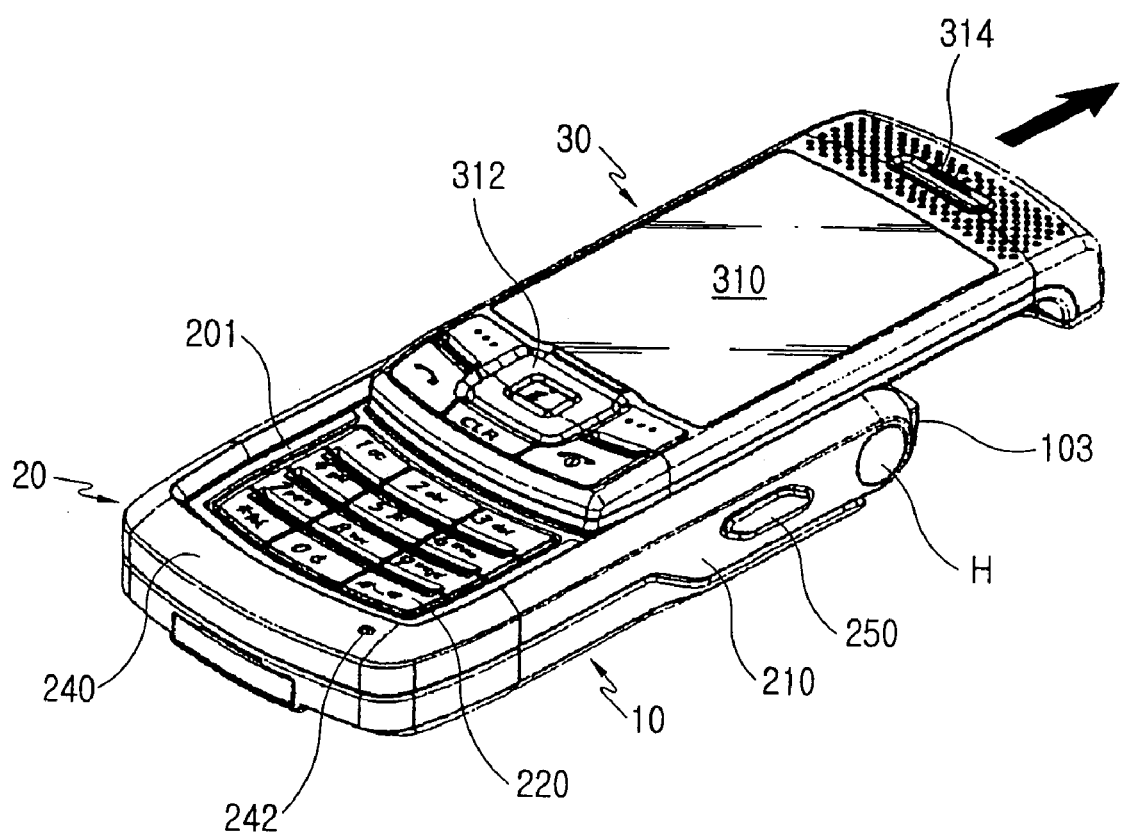
FIG. 2 is a perspective view of a portable communication terminal in which a slide unit according to the present invention slides open.

The slide unit 30 is combined with the main body unit 10 by a slide module (not shown) and slides to open the rotation unit while facing the main body unit 10 (FIG. 2). The slide unit 30 closes the main body unit 10 in FIG. 1. In a state where the rotation unit 20 is folded to the main body unit 10, the slide unit 30 slides on a top 201 (see FIG. 2) of the rotation unit 20 to open the rotation unit 20. The sliding unit 30 closes the main body unit 10 in FIG. 1, and the sliding unit 30 moves to open the top 101 of the main body unit 10 in FIG. 2.

The slide unit 30 can slide to open or close the top 201 of the rotation unit 20. As shown in FIGS. 1-4, the rotation unit 20 can rotate on the main body unit 10 after the slide unit 30 completes its slide to open. In other words, rotation of the rotation unit 20 depends on movement of the sliding unit 30 and thus the rotation unit 20 can rotate only when the top 201 of the rotation unit 20 is completely opened.

Figure 4:
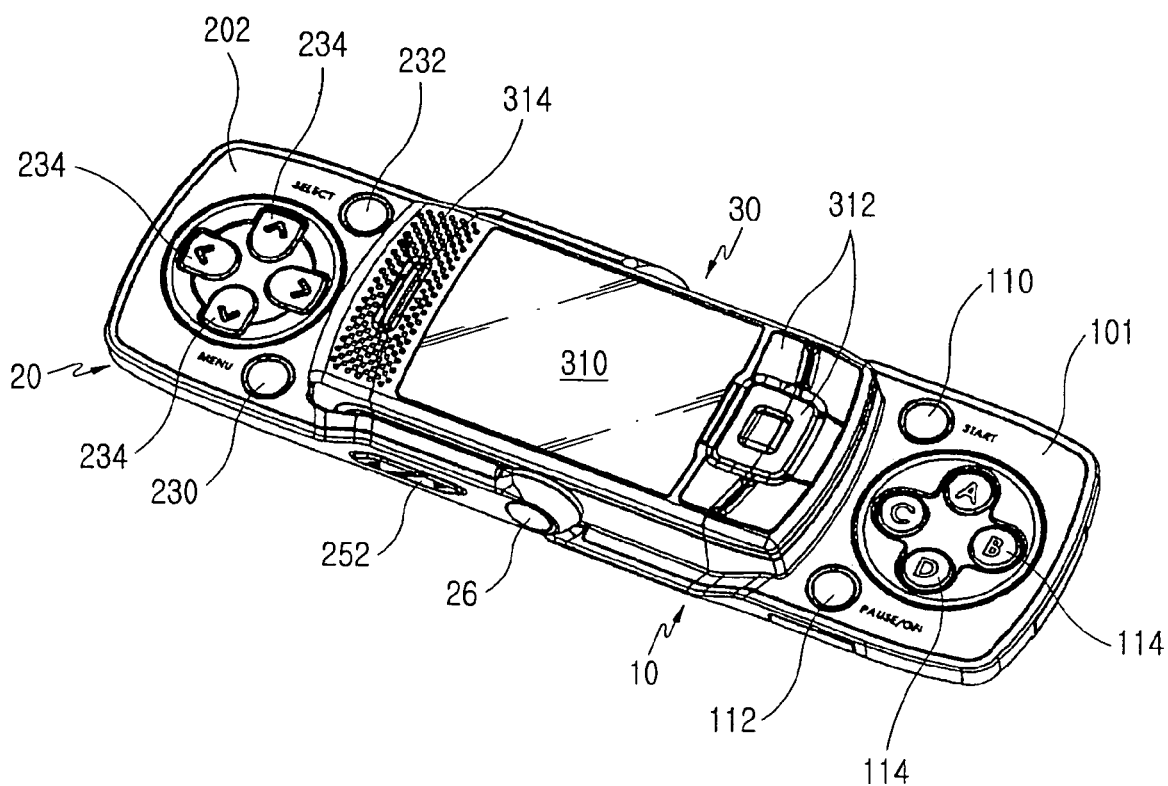
FIG. 4 is a perspective view of a portable communication terminal in which a rotation unit according to the present invention rotates approximately 180° from a completely closed state of the terminal to facilitate a data input operation in a game mode.

As shown in FIG. 4, when the rotation unit 20 rotates to open approximately 180° about the hinge shaft A, the top 101 of the main body unit 100 is disposed at one side of the slide unit 30 and a bottom 202 of the rotation unit 20 is disposed at an other side of the slide unit 30. In other words, the top 101 of the main body unit 10 and the bottom 202 of the rotation unit 20 are disposed at opposite sides of the slide unit 30 after the rotation unit rotates to open approximately 180°.

Figure 3:
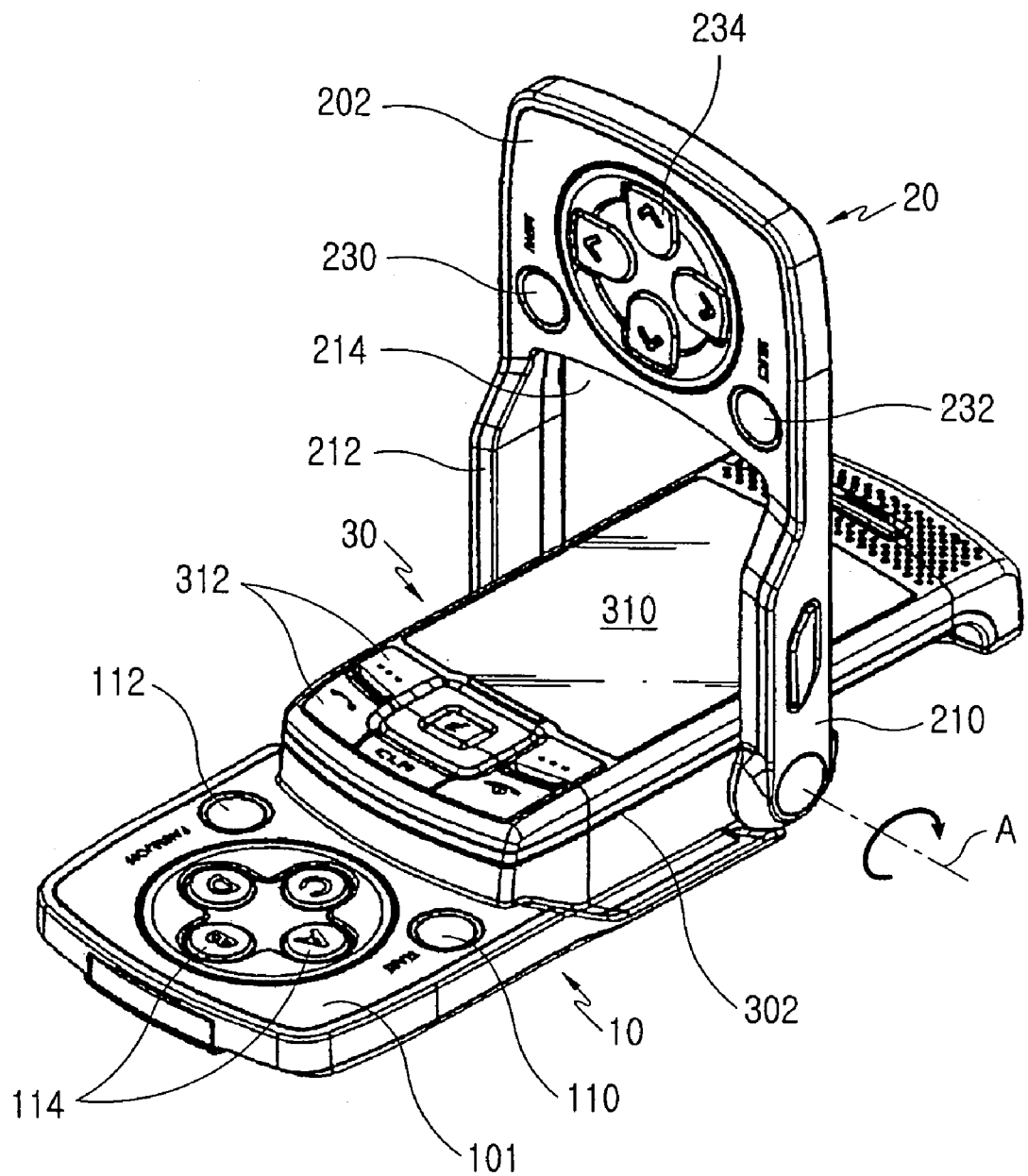
FIG. 3 is a perspective view of a portable communication terminal in which a rotation unit according to the present invention rotates approximately 90°.

As shown in FIG. 3, the top 101 of the main body unit 10 is disposed in a position, specifically a plane, stepped down to a predetermined depth from a bottom 302 of the slide unit 30. As shown in FIG. 2, the top 201 of the rotation unit 20 is disposed in a position, specifically a plane, stepped down to another predetermined depth from an outer circumferential portion 240 of the rotation unit 20. Since the top 201 of the rotation unit 20 is stepped, the slide unit 30 contacts the top 201 of the rotation unit 20 and slides on the top 201 of the rotation unit 20 to open or close the rotation unit 20.

Referring to FIGS. 2 and 3, the rotation unit 20 is rotatably combined with the main body unit 10 by the hinge unit H at one end 103 of the main body unit 10 (FIG. 2), specifically at a position located most away from the top 101 of the main body unit 10 (FIG. 3). To this end, the rotation unit 20 includes a pair of connection arms 210 and 212 and an opening 214 for receiving the slide unit 30 between the connection arms 210 and 212. In particular, the rotation unit 20 receives one side section of the slide unit 30 (FIG. 2) or the other side section of the slide unit 30 (FIG. 4) according to rotation of the rotation unit 20.

The shaft A of the hinge unit H is perpendicular to the slide direction of the slide unit 30, thereby facilitating user's opening and closing operations. The user can with one hand easily slide the slide unit 30 or rotate the rotation unit 20 while holding the portable communication in the same hand.

Figure 5:
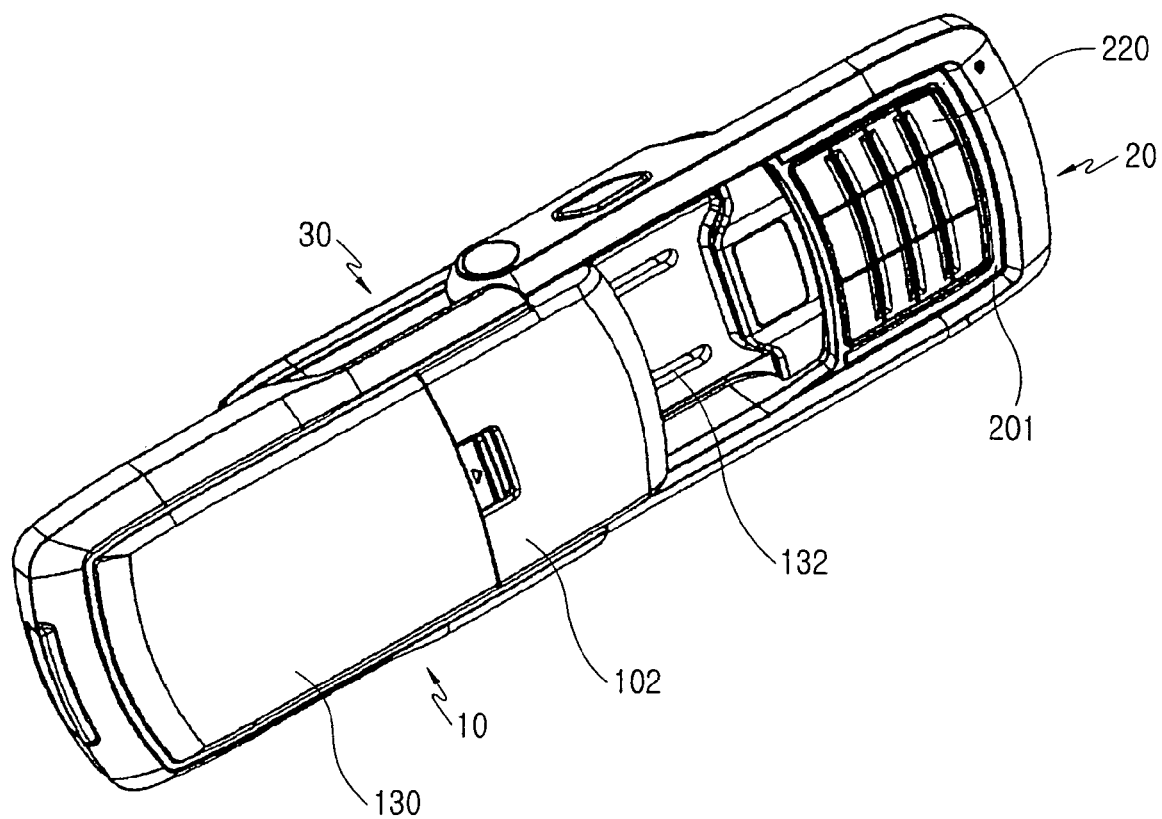
FIG. 5 is a perspective view showing the bottom of the portable communication terminal of FIG. 4.

As shown in FIG. 5, a battery pack 130 is disposed in the bottom 102 of the main body unit 10. A guide rail 132 of the slide module (not shown) is also shown in FIG. 5. The top 201 of the rotation unit 20 is disposed in the same orientation as the bottom 102 of the main body unit 10.

The slide unit 30 slides linearly on the main body unit 10, in which a semi-automatic force and a guide are provided by a slide opening/closing module (not shown).

Hereinafter, the structure of a user interface device of the portable communication terminal according to the present invention will be described with reference to FIGS. 1 through 5.

As shown in FIGS. 1 through 4, the main body unit 10 includes a first data input unit (110, 112, and 114) (see FIG. 3), the rotation unit 20 includes a second data input unit (220, 230, 232, and 234) (see FIGS. 2 and 3), and the slide unit 30 includes a display unit 310. The second data input unit is combined with the first data input unit by the hinge shaft A at a predetermined position of the main body unit 10 to be folded or unfolded (see FIG. 3). The second data input unit rotates towards or away from the top 101 of the first data input unit to close or open respectively the top 101 of the first data input unit (see FIG. 3).

The display unit 310 is combined with the first data input unit while facing the first data input unit and moves while being maintained opposed to the first data input unit. The display unit 310 slides on the top 201 of the second data input unit in a state where the second data input unit is folded to the first data input unit.

The first data input unit includes a first keypad. The first keypad includes a start key 110, a pause/off key 112, and a 4-way key 114. The second data input unit is a double-sided keypad device and includes a second keypad with a plurality of keys on its top 201 and a third keypad with a plurality of keys on its bottom 202. The second keypad includes 3×4 keys 220 with alphanumeric keys and character keys (see FIG. 2), and the third keypad includes a menu key 230, a selection key 232, and a 4-way key 234 (see FIG. 3).

The slide unit 30 includes a fourth keypad 312 having a plurality of keys at an end on a top side of the slide unit 30 and a speaker device 314 disposed on the top side of the slide unit 30 and at an opposite side to the fourth keypad 312 with respect to the display unit 310 (see FIG. 2). The fourth keypad 312, the display unit 310, and the speaker device 314 are exposed to the outside at all times. It is preferable that the display unit 310 be implemented with a Liquid Crystal Display (LCD) or a touch screen.

As shown in FIG. 5, if the second data input unit is completely rotated from the first data input unit, the second keypad 220 is disposed in the same orientation as the bottom 102 of the first data input unit.

As shown in FIG. 1, the second data input unit includes a microphone device 242 at a corner portion of the outer circumferential portion 240 in consideration of a distance to the speaker device 314.

The first keypad is disposed on the top 101 of the first data input unit which is stepped down to a first predetermined depth from the bottom 302 of the display unit 30 (see FIG. 3). The second keypad is disposed on the top 201 of the second data input unit which is stepped down to a second predetermined depth from the outer circumferential portion 240 (see FIG. 2).

The second data input unit includes the pair of connection arms 210 and 212 and the opening 214 for receiving the display unit 310 between the connection arms 210 and 212. The opening 214 receives one side section of the display unit 310 (FIG. 2) or the other side section of the display unit 310 (FIG. 4) according to rotation of the second data input unit.

As shown in FIG. 2, when the display unit 310 slides a predetermined distance from the second data input unit, the second keypad 220 is exposed and the second keypad and the fourth keypad 312 becomes adjacent to each other, thereby allowing the user to easily input data in the phone mode. FIGS. 1 and 2 show states in the phone mode.

As shown in FIG. 4, when the second data input unit rotates a predetermined angle, specifically approximately 180°, to move from one side of the display unit 310 to the other side of the display unit 310, the first keypad and the third keypad become disposed in opposite sides with respect to the display unit 310, thereby facilitating a user's data input operation, specifically key pressing, with both hands in the game mode. FIG. 4 shows a game mode state.

In a state shown in FIG. 1, the speaker device 314, the display unit 310, the fourth keypad 312, and the microphone device 242 are disposed sequentially one after the other. In a state shown in FIG. 2, the speaker device 314, the display unit 310, the fourth keypad 312, the second keypad, and the microphone device 242 are disposed sequentially one after the other. In the game mode state shown in FIG. 4, the third keypad, the speaker device 314, the display unit 310, the fourth keypad 312, and the first keypad are disposed sequentially one after the other.

As shown in FIGS. 2 and 4, a fourth key 250 and a fifth key 252 are disposed in outer sides of the connection arms 210 and 212, respectively.

As described above, according to the present invention, a slide type and a fold type are combined, thereby facilitating a user's operation in a game mode as well as in a phone mode. In particular, although four keypads and a wide display unit are provided, the size of the portable communication terminal does not increase in a completely closed state, thereby contributing to miniaturization. Moreover, since the portable communication terminal is used as the slide type in the phone mode, it is easy to manipulate keys, provide the wide display unit, and open or close the portable communication terminal. Since the portable communication terminal is used as the slide-then-fold type in the game mode, the wide display unit is provided in the game mode and easiness in key manipulation with both hands, i.e., the promptness and accuracy of key manipulation, is provided.

While the invention has been shown and described with reference to certain preferred embodiments thereof, it will be understood by those skilled in the art that various changes in form and details may be made therein without departing from the spirit and scope of the invention.

What is claimed is:

1. A portable communication terminal comprising:
   a main body;
   a rotation unit rotatably combined the main body by a hinge shaft at a predetermined position of the main body and rotatable towards or away from a top of the main body to close or open respectively the top of the main body;
   a slide unit slidably combined with the main body so that the slide unit, while facing the main body, is slidable on a top of the rotation unit to open or close the rotation unit when the top of the main body is closed by the rotation unit; and
   a first keypad including a plurality of keys on the top of the rotation unit,
   wherein the rotation unit can rotate only after the slide unit slides a predetermined distance from the main body, and wherein the top of the slide unit is always exposed.

2. The portable communication terminal of claim 1, wherein after the rotation unit rotates a predetermined angle, the top of the main body and a bottom of the rotation unit are disposed at same orientation and at opposite sides of the slide unit.

3. The portable communication terminal of claim 1, further comprising:
   a second keypad including a plurality of keys on the top of the main body;
   a third keypad including a plurality of keys on a bottom of the rotation unit; and
   a display unit disposed on a top of the slide unit.

4. The portable communication terminal of claim 1, wherein the top of the main body is formed in a position stepped down to a first predetermined depth from a bottom of the slide unit and the top of the rotation unit is formed in a position stepped down to a second predetermined depth from the bottom of the slide unit.

5. The portable communication terminal of claim 1, wherein the rotation unit comprises:
   a pair of connection arms; and
   an opening for receiving the slide unit between the connection arms,
   wherein the opening receives one side section of the slide unit or an other side section of the slide unit according to rotation of the rotation unit.

6. The portable communication terminal of claim 1, wherein the hinge shaft is perpendicular to a slide direction of the slide unit.

7. A user interface device of a portable communication terminal, the user interface device comprising:
   a first data input unit:
   a second data input unit which is rotatably combined with the first data input unit by a hinge shaft at a predetermined position of the first data input unit, and is rotatable towards or away from a top of the first data input unit to close or open respectively the top of the first data input unit;
   a display unit which is slidably combined with the first data input unit, and, while facing the first data input unit, is slidable to open or close a top of the second data input unit when the top of the first data input unit is closed by the second data input unit; and
   a first keypad including a plurality of keys on the top of the second data input unit,
   wherein the second data input unit can rotate only after the display unit slides a predetermined distance from the first data input unit, and wherein a top of the display unit is always exposed.

8. The user interface device of claim 7, wherein the first data input unit includes a second keypad having a plurality of keys on the top of the first data input unit and a third keypad on a bottom of the second data input unit in opposition to the second keypad.

9. The user interface device of claim 8, wherein each of the first keypad and the third keypad includes a 4-way key.

10. The user interface device of claim 7, wherein the display unit comprises:
    a fourth keypad having a plurality of keys; and
    a speaker device disposed in an opposite side to the fourth keypad with respect to the display unit.

11. The user interface device of claim 7, wherein the second data input unit further comprises a microphone device at a corner portion on the top thereof.

12. The user interface device of claim 8, wherein after the second data input unit rotates a predetermined angle to move from one first side of the display unit to an other side of the display unit opposite the first side, the first keypad and the third keypad are disposed in opposite sides of the display unit, thereby facilitating a data input operation with both hands.

13. The user interface device of claim 8, wherein the first keypad is disposed in a plane stepped down to a first predetermined depth from a bottom of the display unit, and the second keypad is disposed in a plane stepped down to a second predetermined depth from an outer circumferential portion of the top of the second data input unit, and the second keypad is opened or closed by sliding the display unit.

14. The user interface device of claim 7, wherein the second data input unit comprises:
    a pair of connection arms;
    an opening for receiving the slide unit between the connection arms,
    wherein the opening receives one side section of the display unit or an other side section of the display unit according to rotation of the second data input unit.

* * * * *